Figure 1:
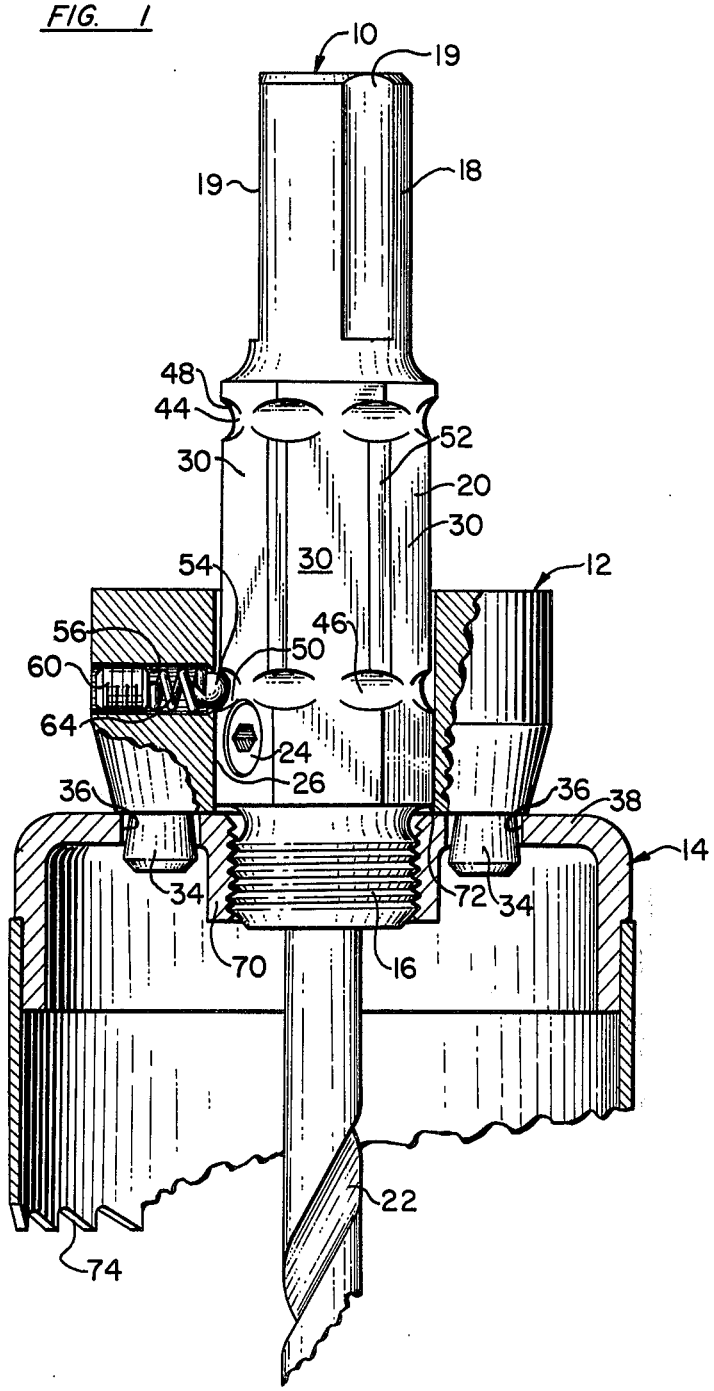

United States Patent [19]

Clark

[11] 4,148,593
[45] Apr. 10, 1979

[54] HOLE SAW ASSEMBLY

[75] Inventor: Calvin M. Clark, Bernardston, Mass.

[73] Assignee: Stanadyne, Inc., Windsor, Conn.

[21] Appl. No.: 872,811

[22] Filed: Jan. 27, 1978

[51] Int. Cl.² .............................................. B23B 41/02
[52] U.S. Cl. .................................... 408/204; 408/206; 408/703
[58] Field of Search ............... 408/200, 201, 204, 205, 408/206, 703, 233, 239

[56] References Cited

U.S. PATENT DOCUMENTS 3,973,862   8/1976   Segal .................................... 408/204
4,036,560   7/1977   Clark .................................... 408/204

Primary Examiner—Harrison L. Hinson

[57] ABSTRACT

A drive collar is non-rotatably mounted for sliding movement on an arbor between working and release positions. In working position, the drive collar is disposed adjacent the base of a hole saw which is threadably mounted on an end of the arbor, and the drive collar has a pair of drive pins projecting into holes in the base of the hole saw for positively transmitting drive torque from the arbor to the saw. The drive pins have a reverse taper to urge the drive collar toward the base of the hole saw.

4 Claims, 2 Drawing Figures

HOLE SAW ASSEMBLY

This invention relates to hole saws and particularly concerns a drive arbor for a hole saw.

A principal object of this invention is to provide a new and improved hole saw and arbor assembly including a quick disconnect arbor featuring means for preventing separation of the arbor from the hole saw during use.

Another object of this invention is to provide such an assembly having a minimum number of parts for simplified manufacture.

A further object of this invention is to provide an assembly of the type described particularly designed for heavy duty application in a compact, rugged construction providing reliable service under demanding operating conditions for an extended period of time.

Other objects will be in part obvious and in part pointed out more in detail hereinafter.

A better understanding of this invention will be obtained from the following detailed description and the accompanying drawing of an illustrative application of this invention.

Figure 2:
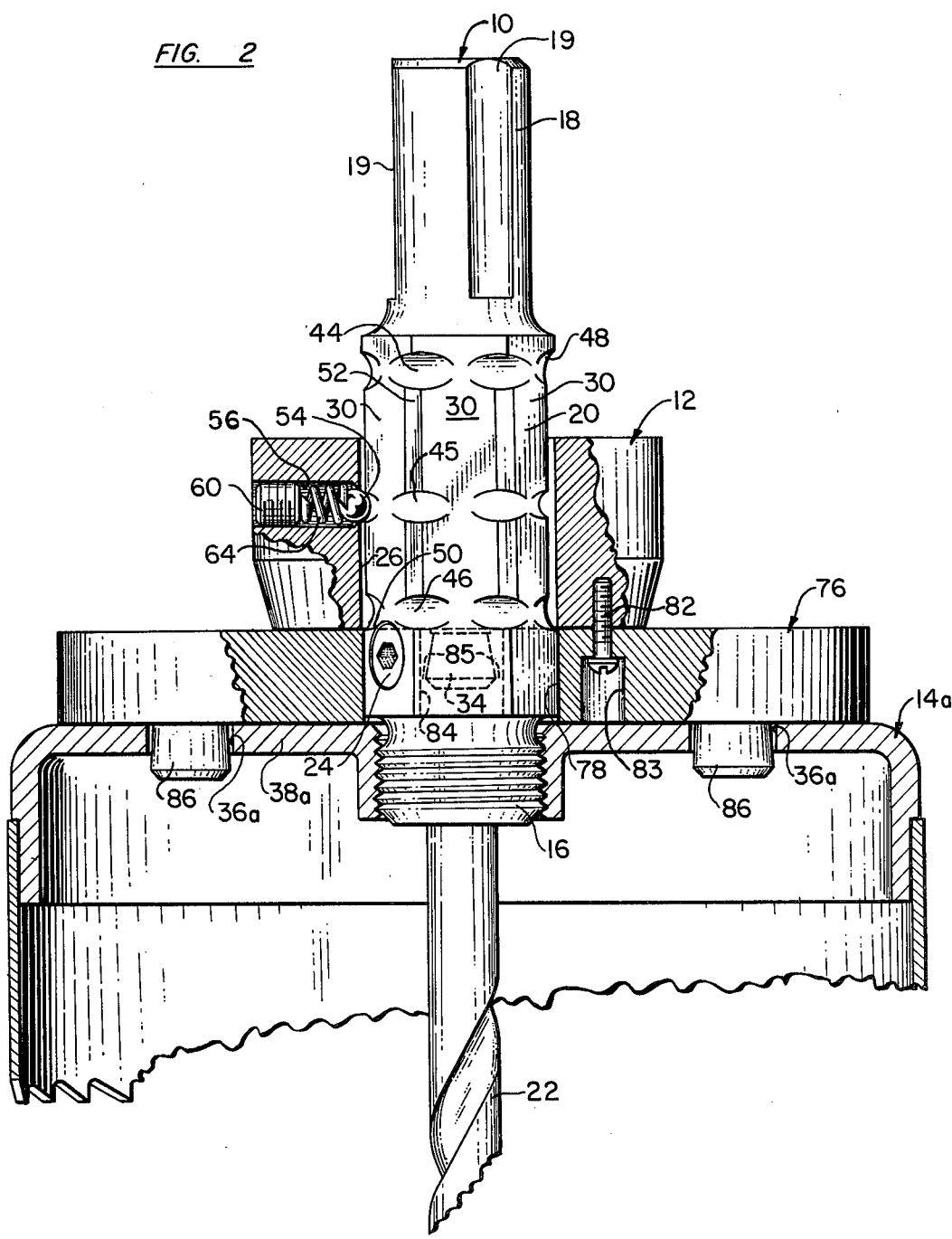

In the drawing:

FIG. 1 is an elevational view, partly broken away and partly in section, showing an assembly incorporating this invention; and FIG. 2 is an enlarged cross-sectional view, partly broken away and partly in section, showing an assembly incorporating this invention particularly suited for heavy duty applications.

Referring now to the drawing in detail, hole saws of a type contemplated in this invention are generally driven by a portable power unit, e.g., a conventional electric drill equipped with a so-called "Jacobs" three jaw chuck. The assembly in FIG. 1 shows an arbor 10, a drive collar 12 and a hole saw 14 which is threadably mounted on a threaded terminal section 16 of the arbor 10.

The arbor 10 may be formed from readily available commercial stock of hexagonal cross section having a width across the flats equal to the width across the flats of its intermediate drive section 20. The threaded terminal section 16 of the arbor being a continuation of section 20 turned a smaller diameter and threaded as shown. This intermediate drive section 20 of the arbor 10 will be hereinafter called the drive shaft for convenience of description and ease of understanding. The chuck engaging section may also be machined to a smaller diameter than the intermediate drive section 20 and provided with three longitudinal grooves 19 for engagement by the jaws of a chuck.

The arbor 10 may conveniently be provided with a central bore, not shown, axially formed in its threaded terminal section 16 for receiving a suitable pilot drill 22 conventionally secured within the bore by a set screw 24 positioned in the body of arbor 10.

To further minimize the number of different component parts the quick disconnect drive collar 12 is designed as a single unit with a central hexagonal aperture 26 for receiving the drive shaft 20. The central aperture 26 of the drive collar 12 engages the flats 30 of the drive shaft 20, whereby collar 12 is quickly and easily nonrotatably mounted on the drive shaft 20 for axial sliding movement.

For coupling the drive collar 12 and saw 14 for rotation in unison with the arbor 10, a pair of depending drive pins 34 are fixed to the drive collar 12, preferably with a press fit in diametrically opposed relation on the collar 12, so as to project into a pair of mating holes 36 formed in a base 38 of the hole saw 14 upon its being mounted on the threaded section 16 of arbor 10. The pins 34 are shown projecting beyond the bottom face of the drive collar 12 a sufficient distance so that the ends of the pins 34 pass completely through the base 38 of the hole saw 14 in positive torque transmitting relation thereto when the drive collar 12 and hole saw 14 are assembled for operation.

As illustrated, the drive shaft 20 of arbor 10 has a pair of spaced grooves 44 and 46 circumferentially extending about the drive shaft 20 with first and second radial shoulders 48 and 50 being defined by the grooves 44 and 46 adjacent opposite ends of the drive shaft 20. The arbor body is turned or machined to remove tips of the longitudinally extending hex corners on the drive shaft 20 between grooves 44 and 46 to reduce the maximum diameter across corners of the drive shaft 20. This technique has been found to be satisfactory to rapidly contour longitudinally extending edges such as at 52 between adjacent flats 30 of the drive shaft 20 to smoothly merge with the adjacent flats 30 and to provide a detent track extending longitudinally along the drive shaft 20 and terminating at its opposite ends at the grooves 44 and 46.

To establish and releasably maintain the drive collar 12 in selected working and release positions, a detent device 54 is provided and the drive collar 12 has a detent receiving radial chamber 56 in communication with the central aperture 26 of the drive collar 12 at one of its corners to register with longitudinal edge 52 for receiving the detent device which cooperates with the grooves 44 and 46 to establish the working and release positions of the drive collar 12 on the drive shaft 20.

The ball detent 54 is urged by spring 64 toward the drive shaft 20 into contact engagement with confronting edge 52 which serves as the track upon which ball detent 54 rides. The spring 64 is shown as a conventional compression spring having its opposite ends seated against the ball detent 62 and an inner terminal end of the set screw 60 which serves as an adjustable spring seat.

By virtue of the above described construction, the radial shoulders 48 and 50 formed by the full size hex corners adjacent grooves 44 and 46 are of enlarged radius relative to the track longitudinally extending along the reduced hex corner or edge 52 of adjacent flats 30 of the drive shaft 20 and the adjustability of the set screw 60 mounted in the drive collar 12 enables the inner end of the set screw 60 to be located so as to prevent movement of the ball detent 54 beyond grooves 44 and 46 in response to manipulation of the drive collar 12. Thus the set screw 60 cooperates with the spring 64 and radial shoulders 48 and 50 to jointly serve as a stop for the ball detent at the grooves 44 and 46 to prevent axial sliding movement of the drive collar 12 on the drive shaft 20 beyond its working and release positions.

The hole saw 14 is easily assembled on the arbor 10 by initially moving drive collar 12 into release position and rotating internally threaded hub 70 on the base 38 of the hole saw 14 onto the threaded section 16 until the base 38 of the hole saw 14 bottoms on shoulder 72 at the end of the drive shaft 20. The hole saw 14 is then backed off slightly to ensure that the base 38 of the hole saw 14 is not bottomed against the drive shaft 20, and to align the holes 36 in the base 38 and the pins 34 of the drive collar 12. The drive collar 12 is then axially shifted from release position into full line working position on the arbor 10 with the drive pins 34 extending through holes 36 in the base 38 of the saw 14 as shown in FIG. 1, thereby establishing a positive torque transmitting drive from the arbor 10 to hole saw teeth 74. It will be understood that the drive which couples the drive collar 12 to the base 38 of the hole saw 14 is such that when assembled, any possibility of the saw 14 bottoming on the shoulder 72 of the arbor drive shaft 20 is precluded, and threaded mounting connection between the hub 70 and the arbor 10 does not cause the hole saw base to lock up with arbor 10. To remove the hole saw 14 from the arbor 10, it is only necessary to slide the drive collar 12 upwardly to drive the ball detent 54 out of groove 44 and along the edge 52, serving as the track on the drive shaft 20 into groove 44 to establish the release position of the drive collar 12 relative to the drive shaft 20. In release position, the drive pins 34 are completely withdrawn from the holes 36 in base 38 of the saw 14 which then may be quickly unscrewed and released from arbor 10.

According to this invention, means are provided for preventing the separation of the hole saw arbor and the hole saw under high vibrational conditions which may be encountered in use. Such vibrational conditions may cause the pins 34 to become intermittently disengaged from the surfaces of the holes 36 of the base 38 of the hole saw due to wide variations in the torsional forces therebetween. Where the pins 34 are cylindrical, the simultaneous axial vibrations may create a force sufficient to cause the detent 54 to be cammed out of the recess 46 against the bias of spring 64. According to this invention, and as shown in the drawings, the pins 34 are provided with a reverse taper, i.e., a taper which diverges toward the ends thereof. Such a taper causes a component of force to be exerted axially in a direction to cam the drive collar 12 against the base 38 of the hole saw 14, thereby assuring that the base 38 and the drive collar 12 are bottomed against each other so that less vibration is encountered. The use of such a taper on pins 34 also reduces the risk that the pins may be sheared off in use. In this regard, note that a greater length of the pins may flex to reduce shear loading.

The embodiment of FIG. 2 is one wherein the invention is applied to a drive arbor incorporating an adapter plate for driving larger diameter hole saws. In this embodiment, drive collar 12 is identical to the one of FIG. 1 and serves as the support for an adapter plate 76. Adapter plate 76 has a non-circular, i.e. hexagonal, aperture 78 therein to receive drive shaft 20 which is of the same cross-sectional configuration. A screw 82 disposed in a counterbore 83 of the adapter plate 76 maintains the adapter plate 76 assembled with the drive collar 12 when the arbor is disposed vertically as shown in FIG. 2.

In this embodiment, the drive pins 34 of the drive collar 12 are received in enlarged openings 84 of the adapter plate 76 and performs no torque transmitting function in view of the clearance 85 between the drive pins 34 and the openings 84. Drive pins 86 fixed to adapter plate 76 project beyond the bottom face of the adapter plate a sufficient distance so that the ends of pins 86 pass completely through the base 38a of the hole saw 14a to transmit torque therebetween. Pins 86 are reversely tapered in the same manner as drive pins 34 of FIG. 1 and function in the same manner as the drive pins 34 of FIG. 1. A groove 45 may be provided to cooperate with ball detent 54 to releasably latch the adapter plate 76 in operatng position when the hole saw is used in an inverted position.

From the foregoing, it will be apparent that this invention provides a rugged hole saw drive unit of simple construction which is inexpensive to manufacture, and at the same time provides for automatically retaining a releasable drive collar and the hole saw in operative engagement regardless of heavy vibrational forces encountered in use.

As will be apparent to persons skilled in the art, various modifications, adaptations and variations of the foregoing specific disclosure can be made without departng from the teachings of the present invention.

I claim:

1. A hole saw assembly comprising a drive arbor having drive shaft and a drive plate non-rotatably secured thereto, a hole saw having a tubular cutting blade and a backing plate and retaining means for retaining said drive plate and said backing plate together in coaxial alignment; said backing plate having a central aperture therein for passing over the end of said drive arbor and a plurality of apertures radially spaced from said central aperture, said drive plate comprising a generally planar member having projections depending therefrom engageable in said apertures of said backing plate, said projections being reversely tapered to urge said backing plate and said drive plate toward each other in use when torque is transmitted therebetween.

2. The hole saw assembly of claim 1 in which said drive plate is axially slidable on said drive arbor between working and release positions.

3. The hole saw assembly of claim 1 including a detent releasably maintaining said drive plate in its working position.

4. The hole saw assembly of claim 2 wherein said drive plate includes a separate adapter plate attached thereto and non-rotatably mounted on drive arbor for mounting the reversely tapered projections.

* * * * *